S. B. COLLIER.
GREASE RETAINER.
APPLICATION FILED JULY 20, 1921.
1,422,741.
Patented July 11, 1922.
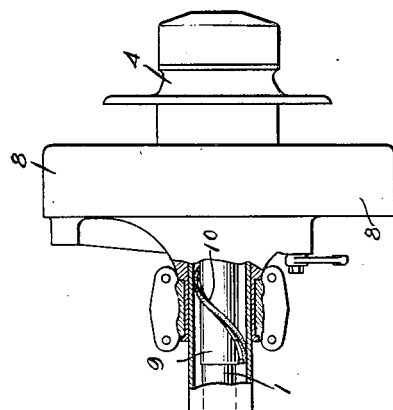
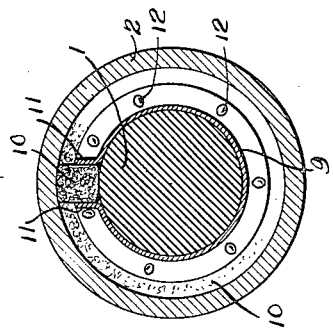
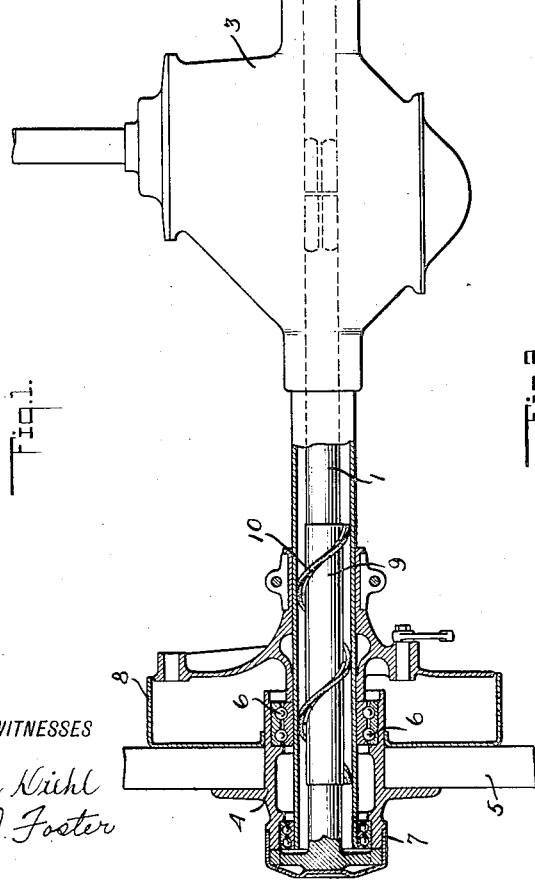
WITNESSES
Fred Kiehl
F. J. Foster
INVENTOR
S. B. Collier
BY Munn & Co
ATTORNEYS

UNITED STATES PATENT OFFICE.

SHADE B. COLLIER, OF ORLANDO, FLORIDA.

GREASE RETAINER.

1,422,741.  Specification of Letters Patent.  Patented July 11, 1922.

Application filed July 20, 1921. Serial No. 486,200.

*To all whom it may concern:*

Be it known that I, SHADE B. COLLIER, a citizen of the United States, and a resident of Orlando, in the county of Orange and State of Florida, have invented a new and Improved Grease Retainer, of which the following is a full, clear, and exact description.

This invention relates to improvements in oil retainers of the character ordinarily used on rear axles of automobiles, the primary object of the invention being to provide a retainer of this character which will positively prevent oil from the differential housing from leaking into the brake drum.

A still further object is to provide a device of this character which can be applied to the axles of certain well known types of cars now on the market without altering the construction of the axles and without greatly increasing the cost of manufacture thereof, and a retainer which will be simple and practical in construction, and durable and efficient in use.

With these and other objects in view, the invention consists in certain novel features of construction and combinations and arrangements of parts as will be more fully hereinafter described and pointed out in the claims.

In the accompanying drawings:

Figure 1 is a top plan view of the rear axle housing of an automobile and its associated parts, with parts broken away for clearness;

Figure 2 is a fragmentary longitudinal sectional view through the axle housing illustrating the details of the oil retainer; and Figure 3 is a view in transverse section on the line 3—3 of Figure 2.

Referring in detail to the drawings, 1 represents the rear axle of an automobile which is accommodated in an axle housing 2. The housing 2 communicates at its intermediate portion with a differential casing 3 which is ordinarily filled with heavy oil or grease.

The hubs 4 of the rear wheels 5 are mounted on the outer ends of the housing 2 and suitable roller bearings such as 6 are interposed between the hubs and the outer ends of the housing. The axle 1 is keyed to the wheel hubs 4, as indicated at 7 so that the wheels are compelled to turn with the axle.

8, 8 represent the brake drums which are associated with the wheel hubs. One common difficulty of all automobiles is the fact that grease frequently leaks into and around the brake drums and decreases the efficiency of the brakes. In order to overcome any leakage of grease between the differential housing and the drums, I provide an improved retainer around each end of the axle between the housing and the outer ends of the axle.

Referring particularly to the retainer, it will be noted that metal sleeves such as 9 are shrunk around the axle and that these sleeves serve to retain spirally wound strips of felt 10 which contact with the inner surface of the axle housing. The sleeves 9 are spirally split and the metal adjacent the slits is bent outwardly to provide spiral channels such as 11, accommodating the strip of felt or similar material 10. Securing devices such as 12 extending across the channels serve to firmly retain the strips 10 in place.

It will be noted that the strips at the opposite ends of the axles are wound in opposite directions, the strips in each instance, being wound in a direction opposite to the direction of rotation of the axle. When the machine is in motion and oil from the differential housing leaks towards the ends of the axle, the strips 10 will effectively bar the passage of the oil and will tend to force the oil back toward the center of the axle.

I have illustrated my invention as applied to one conventional type of rear axle. It will be obvious, however, that with very slight alterations it might be applied to other axles on the market and numerous other slight changes and alterations might be made in the general form and arrangement of the parts described without departing from the invention and hence I do not wish to limit myself to the precise details of construction, but shall consider myself at liberty to make such slight changes and alterations as fairly fall within the spirit and scope of the appended claims.

I claim:

1. The combination with an axle and axle housing, and a differential housing communicating with the intermediate portion of the axle housing, of means preventing a leakage of oil from the differential casing to the ends of the axle when the axle is in motion, said means including sleeves fitting tightly around the axle adjacent its ends, strips of flexible material spirally wound about the sleeves and means integral with the sleeves for retaining said strips in place, said last mentioned means including spiral flanged channels integrally formed in the sleeves and receiving the strips.

2. The combination with a floating axle and a housing therefor, of sleeves fitting the ends of the axle, said sleeves being spirally slit, the metal adjacent the slits being turned outwardly to provide flanged channels, strips of flexible material in the channels engageable with the housing, securing devices connecting the flanges and holding said strips in place.

3. The combination with an axle and a housing therefor, of a sleeve fitting the axle, said sleeve being spirally slit, the metal adjacent the slits being turned outwardly to provide a flanged channel, and a strip of flexible material in the channel engageable with the housing.

SHADE B. COLLIER.